(12) United States Patent
Ragan

(10) Patent No.: US 11,505,409 B2
(45) Date of Patent: Nov. 22, 2022

(54) TWO-AXIS MODULAR BELT AND CONVEYOR

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 17/421,956

(22) PCT Filed: Jan. 29, 2020

(86) PCT No.: PCT/US2020/015560
§ 371 (c)(1),
(2) Date: Jul. 9, 2021

(87) PCT Pub. No.: WO2020/163129
PCT Pub. Date: Aug. 13, 2020

(65) Prior Publication Data
US 2022/0119198 A1 Apr. 21, 2022

Related U.S. Application Data

(60) Provisional application No. 62/801,690, filed on Feb. 6, 2019.

(51) Int. Cl.
*B65G 47/53* (2006.01)
*B65G 17/06* (2006.01)
*B65G 17/44* (2006.01)
*B65G 17/40* (2006.01)

(52) U.S. Cl.
CPC ............. *B65G 17/44* (2013.01); *B65G 17/40* (2013.01); *B65G 47/53* (2013.01)

(58) Field of Classification Search
CPC ........ B65G 17/06; B65G 17/40; B65G 17/44; B65G 47/53
USPC .......................................................... 198/850
See application file for complete search history.

(56) References Cited

U.S. PATENT DOCUMENTS

| | | | |
|---|---|---|---|
| 853,129 A | 5/1907 | Simpson | |
| 3,451,526 A | 6/1969 | Fernandez | |
| 4,882,901 A | 11/1989 | Lapeyre | |
| 6,568,522 B1 | 5/2003 | Boelaars | |
| 6,966,742 B2 | 11/2005 | Tokita et al. | |
| 7,073,651 B2 * | 7/2006 | Costanzo | B65G 13/12 198/359 |
| 7,147,097 B2 | 12/2006 | Lemm | |
| 7,306,086 B2 * | 12/2007 | Boelaars | B65G 47/53 198/782 |
| 7,527,143 B2 | 5/2009 | Krisl et al. | |

(Continued)

FOREIGN PATENT DOCUMENTS

| | | |
|---|---|---|
| EP | 1468943 A2 | 10/2004 |
| JP | 07-267346 A | 10/1995 |

OTHER PUBLICATIONS

Supplementary European Search Report, European Patent Application No. 20752338.2, dated Jul. 8, 2022.

*Primary Examiner* — Douglas A Hess
(74) *Attorney, Agent, or Firm* — James T. Cronvich

(57) ABSTRACT

A two-axis modular belt comprising two orthogonal belt loops intersecting at a union on a carryway. The belt is constructed of rectangular belt modules arranged in rows and columns. The modules are interconnected by hinge elements that allow columns of an advancing belt loop to translate relative to the rows of the other stationary belt loop.

22 Claims, 6 Drawing Sheets

(56) References Cited

U.S. PATENT DOCUMENTS

| | | | |
|---|---|---|---|
| 7,571,701 B1 * | 8/2009 | Rice | F02F 7/0012 123/90.38 |
| 8,939,279 B2 * | 1/2015 | Porter | B65G 17/24 198/779 |
| 9,038,810 B2 * | 5/2015 | Schroader | B65G 47/22 198/407 |
| 9,889,992 B1 | 2/2018 | Adomaitis et al. | |
| 9,908,708 B1 | 3/2018 | Adomaitis et al. | |
| 2005/0065642 A1 | 3/2005 | Brixius et al. | |
| 2016/0185529 A1 | 6/2016 | Bauer | |

* cited by examiner

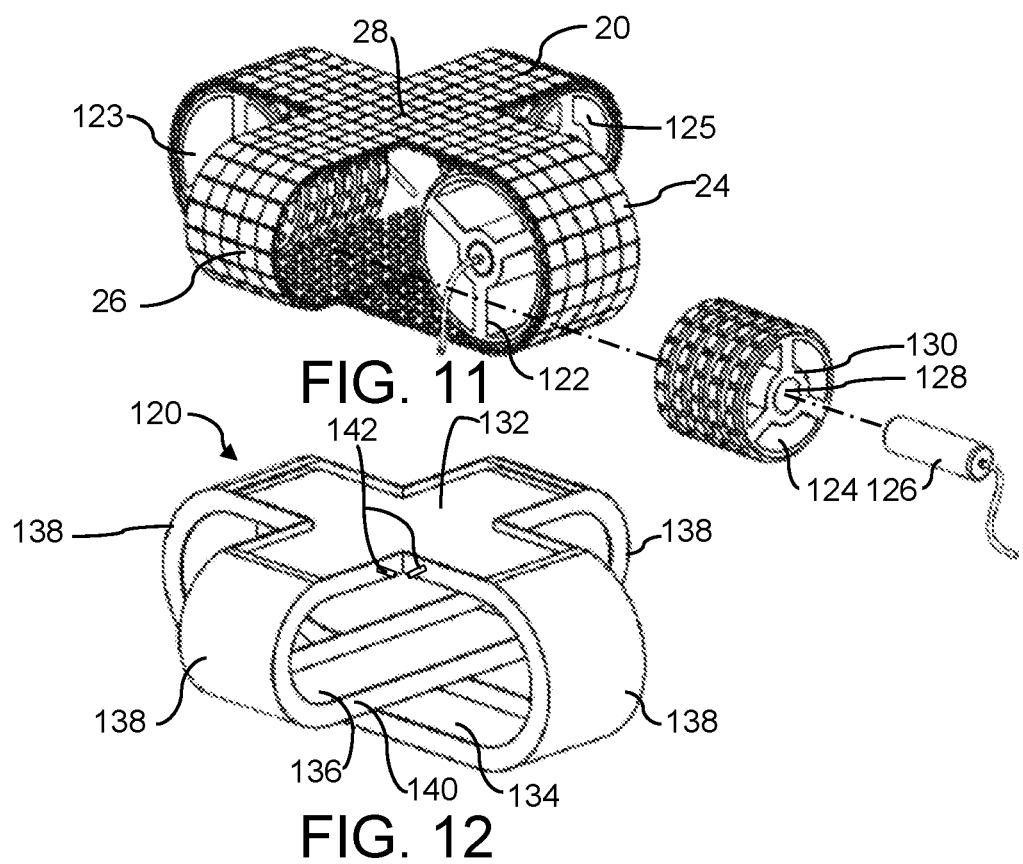
FIG. 11
FIG. 12
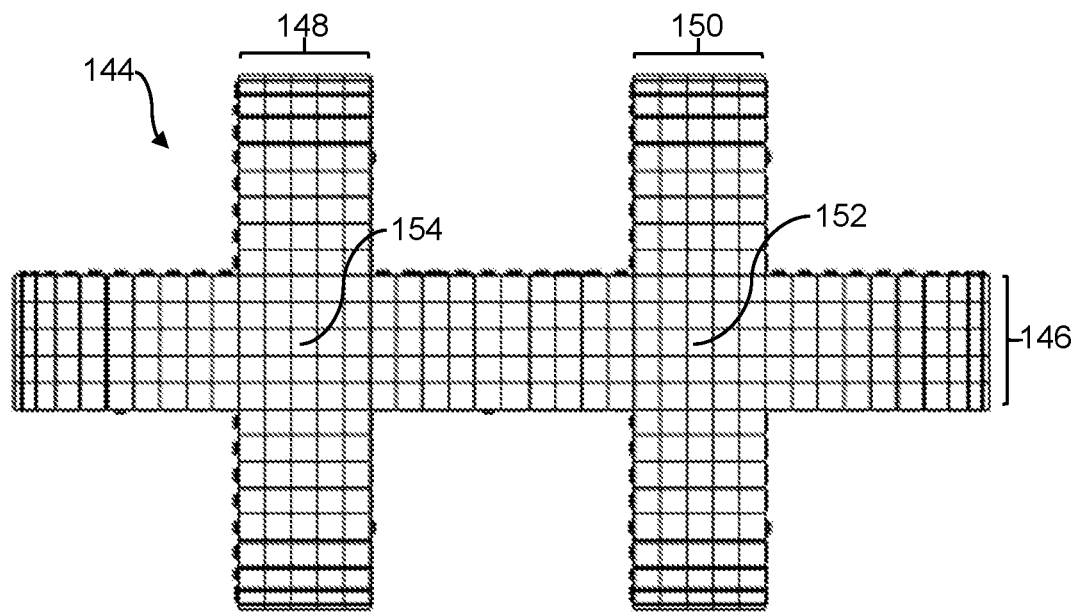
FIG. 13

TWO-AXIS MODULAR BELT AND CONVEYOR

BACKGROUND

The invention relates generally to power-driven conveyors and more particularly to articulating modular conveyor belts and associated conveyors.

Many conveying applications require that conveyed packages change direction by 90°. Pushers, activated rollers, swivel rollers, and cross belts are some of the diverters used to redirect packages 90°. Pushers can damage packages or their contents through impacts. And package trajectories on the other diverters are not always consistent across ranges of package sizes and shapes.

SUMMARY

One version of a conveyor belt module embodying features of the invention comprises a rectangular platform having a first pair of adjacent sides and a second pair of adjacent sides. A first hinge element extends downward from the platform along each side of the first pair of adjacent sides. A second hinge element extends downward from the platform along each side of the second pair of adjacent sides. The first hinge elements form elongated channels extending parallel to each side of the first pair of adjacent sides and open at opposite ends. The second hinge elements form slide members that are receivable in the elongated channels of adjacent such conveyor belt modules to slide along and to rotate in the channels.

One version of a conveyor belt embodying features of the invention comprises a first belt loop and a second belt loop. The first belt loop is arranged to advance along a first path and includes a plurality of belt modules interconnected by hinge elements in first rows extending across the width of the first belt loop and first columns extending the length of the first belt loop. The second belt loop includes a plurality of belt modules interconnected by hinge elements in second rows extending across the width of the second belt loop and second columns extending the length of the second belt loop. The second belt loop is arranged to advance along a second path intersecting the first path perpendicularly at a union of the first and second belt loops. The belt modules at the union are shared by the first and second belt loops.

One version of a conveyor embodying features of the invention comprises a modular conveyor belt composed of a first belt loop arranged to advance along a first path and including a plurality of belt modules interconnected by hinge elements in first rows defining the width of the first belt loop and first columns defining the length of the first belt loop. A second belt loop includes a plurality of belt modules interconnected by hinge elements in second rows defining the width of the second belt loop and second columns defining the length of the second belt loop. The first belt loop is trained around first reversing wheels and is driven by at least one of the first reversing wheels along a first path. The first path includes an upper carryway segment between the first reversing wheels and a lower return segment below the carryway segment. The second belt loop is trained around second reversing wheels and is driven by at least one of the second reversing wheels along a second path. The second path includes an upper carryway segment between the second reversing wheels and a lower return segment below the carryway segment. The second path intersects the first path perpendicularly at a union of the first and second belt loops on the carryway segments of the first and second paths. The belt modules at the union are shared by the first and second belt loops.

BRIEF DESCRIPTION OF THE DRAWINGS

FIG. 11 is a partly exploded isometric view of a conveyor using a conveyor belt as in FIG. 1 driven by motorized-roller-driven drive wheels.

FIG. 12 is an isometric view of a conveyor frame for a conveyor as in FIG. 11.

FIG. 13 is a top plan view of another version of a conveyor as in FIG. 11 with one first axis and two second axes.

DETAILED DESCRIPTION

Figure 1:
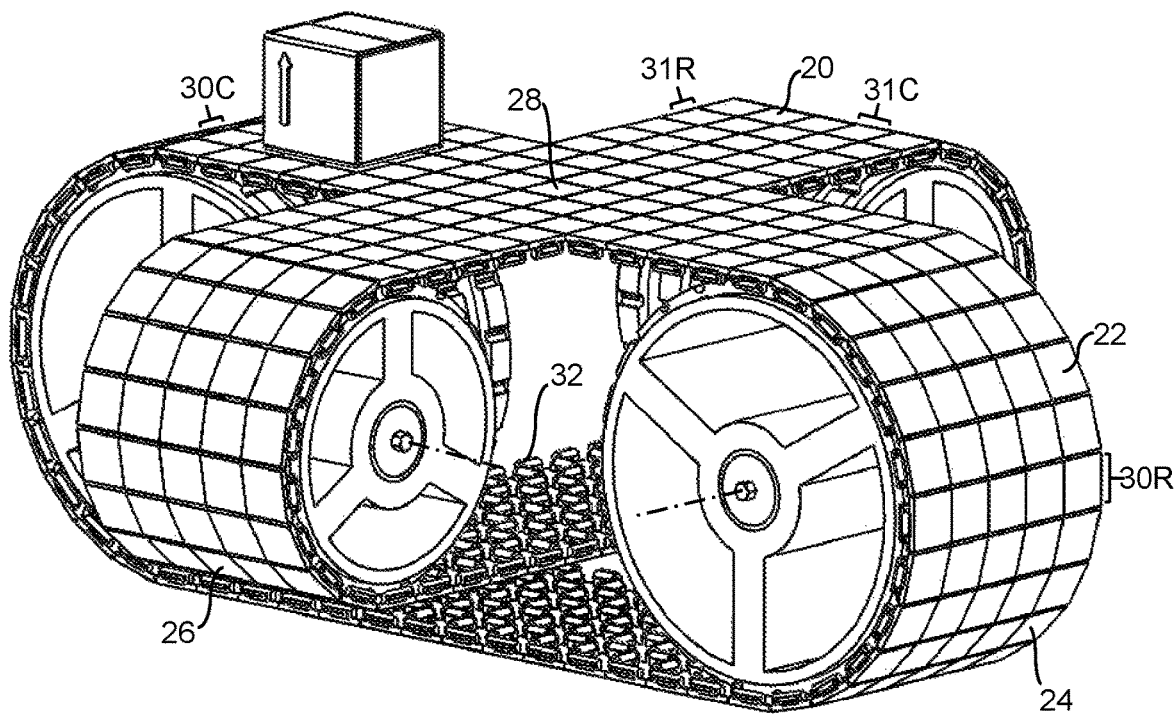
FIG. 1 is a perspective view of a two-axis modular belt conveyor embodying features of the invention.

One version of a two-axis modular conveyor belt embodying features of the invention is shown in FIG. 1. The modular conveyor belt 20 is constructed of rectangular belt modules 22 arranged in rows and columns. In the examples shown the rectangular modules 22 are square, but they could be non-square rectangles. The conveyor belt includes a first belt loop 24 arranged to advance along a first path and a second belt loop 26 arranged to advance along a second path perpendicular to the first path at a union 28 of the first and second belt loops. The rows 30R, 31R of belt modules extend across the loops' widths; the columns 30C, 31C extend the lengths of the loops. The belt modules 22 at the union 28 of the two belt loops 24, 26 are shared by the two loops. At the union 28 the rows 30R of the first belt loop 24 are the columns 31C of the second belt loop 26, and the columns 30C of the first belt loop are the rows 31R of the second belt loop. A lower portion 32 of the second belt loop 26 lies within the first belt loop 24.

One version of a belt module 22 that enables the sharing of modules by both belt loops at the union is shown in FIGS.

2A and 2B connected to an identical belt module 22'. The module 22 includes a rectangular platform 34 having a first pair of adjacent sides 36, 37, a second pair of adjacent sides 38, 39, and a square top surface 40. First hinge elements 42 extend downward from the platform 34 along the first pair of adjacent sides 36, 37. Second hinge elements 44 extend downward from the module along the second pair of adjacent sides 38, 39. The first hinge elements 42 are hook-shaped with a shank 43 that extends down from the bottom of the platform through an outward bend 45 to a tip end 56. An upwardly open throat 47 is formed between the shank 43 and the tip end 56. The throat 47 forms an elongated channel 46 that extends parallel to its associated side 36, 37 of the platform 34. The second hinge elements 44 form pins 48. Adjacent modules 22, 22' are interconnected by mating a first hinge element 42 of one module 22' with a second hinge element 44 of another module 22 at a hinge joint 49. The pins 48, which extend parallel to the associated sides 38, 39, are generally circular in cross section with a radius that equals or is slightly less than the radius of curvature of the bed 50 of the channels 46 of the hook-shaped hinge elements 42. The pins 48 nestle in the channels 46 concentric with the centers of curvatures of the channel beds 50 and define an articulation axis about which the belt articulates when rounding reversing wheels, such as drive and idler sprockets. The channels 46 are open at both ends so that the pins 48, serving as slide members, can slide along the channels 46 of adjacent modules. The pins 48 are attached at opposite ends to the platform 34 by arms 52, forming a gap 54 bounded by the pin, the arms, and the platform. The gap 54 extends the articulation range of two adjacent belt modules 22, 22' by providing clearance for the tip end 56 of the interconnected hook-shaped hinge element 42 as the pin 48 rotates in the channel 46. The sides 58 of the tip end 56 of the laterally elongated hook-shaped hinge elements 42 are tapered to help guide the tip end into the gap 54.

Figure 3A:
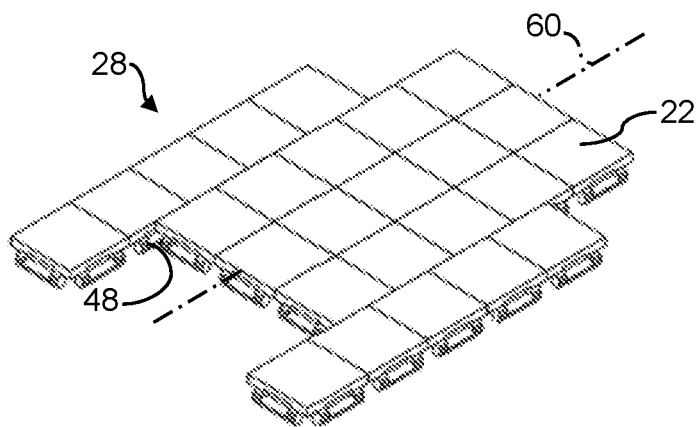
FIG. 3A is an isometric view of a portion of a two-axis conveyor belt as in FIG. 1 showing translation of some of the belt modules along a first axis.
Figure 3B:
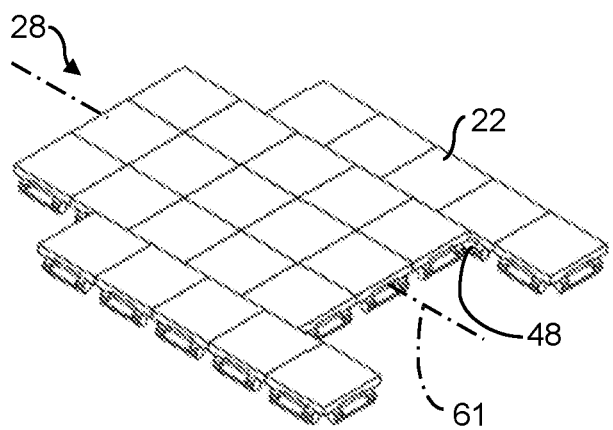
FIG. 3B is an isometric view of that portion showing translation of some of the belt modules along a second axis perpendicular to the first axis.

As shown in FIGS. 3A and 3B, the shared rows and columns of belt modules 22 in the union 28 of the two orthogonal belt loops can be translated along perpendicular axes 60, 61 in the direction of the moving belt loop. Of course, only one belt loop at a time can be moved. As one of the belt loops advances through the union 28, the pins 48 on one side of the loop slide through the aligned channels of the stationary belt loop, and the hook-shaped hinge elements on the other side of the advancing belt loop slide along the pins 48 on the stationary belt loop.

Figure 2A:
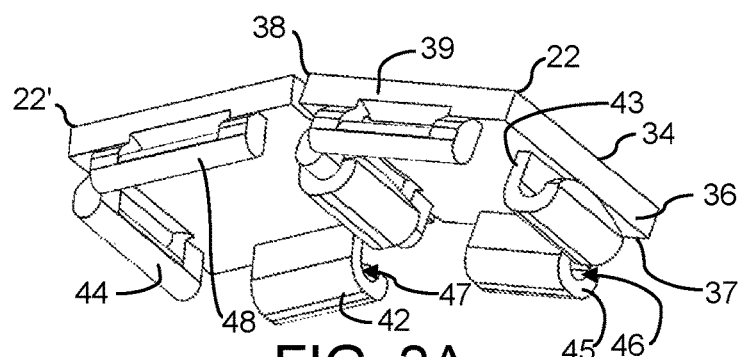
FIGS. 2A and 2B are bottom and top views of pairs of connected belt modules used to build a conveyor belt as in FIG. 1.
Figure 2B:
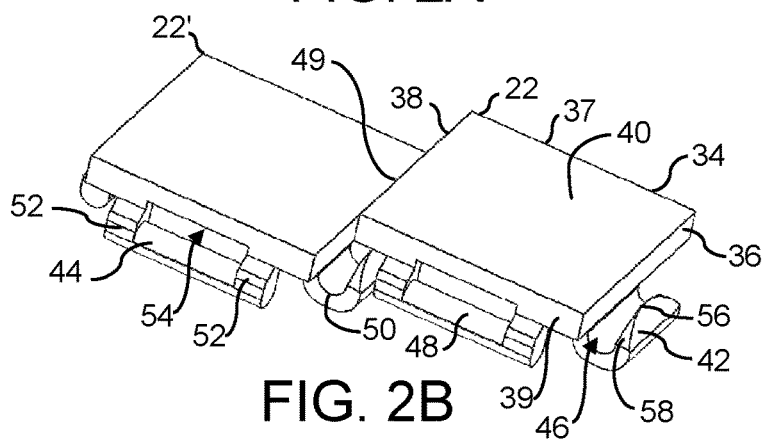
Figure 4:
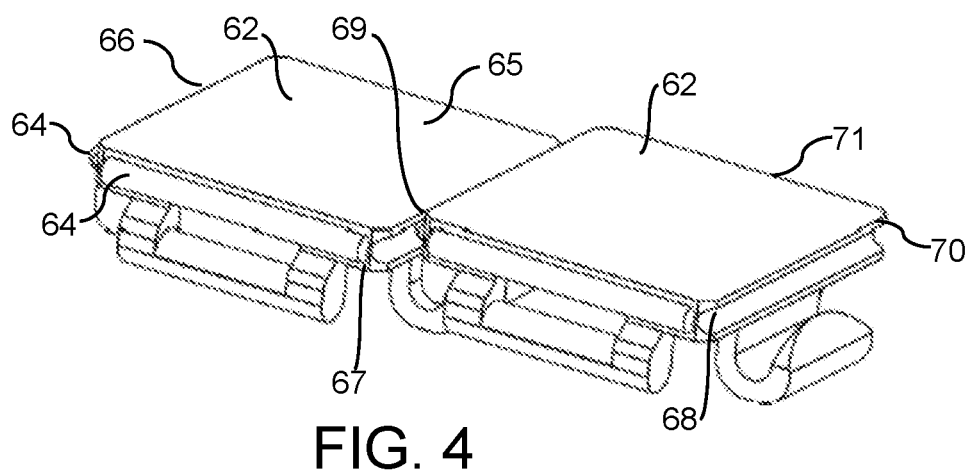
FIG. 4 is an isometric view of another version of a pair of belt modules usable in a conveyor belt as in FIG. 1.

The belt modules 62 in FIG. 4 include an additional feature absent in the modules of FIGS. 2A and 2B. Half rounds 64 protrude outward of two adjacent sides 66, 67 of the platform 65. Half pipes 68 open at both ends are recessed into the other two sides 70, 71. The half pipes 68 of one module 62 receive the half rounds of an adjacent module at a hinge joint 69. The half pipes 68 and half rounds 64 help resist jams as the modules 62 slide past each other.

Figure 5A:
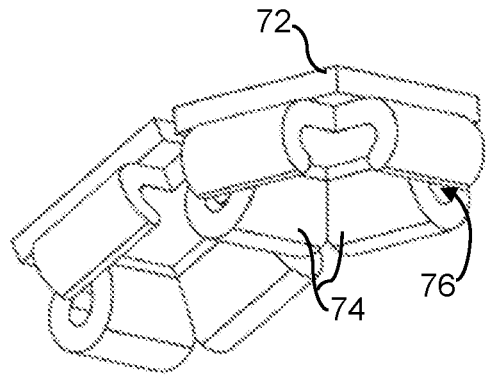
FIGS. 5A and 5B are bottom and top views of yet another version of a pair of belt modules having hook-shaped hinge elements at all four sides and that are usable in a conveyor belt as in FIG. 1.
Figure 5B:
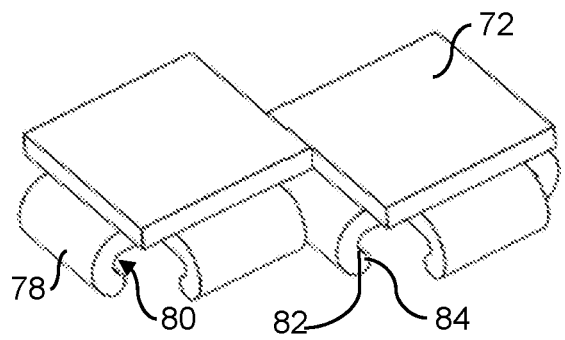

Another version of a belt module usable in a conveyor belt as in FIG. 1 is shown in FIGS. 5A and 5B. In this belt module 72, the pin of the second hinge elements of the modules in FIGS. 2A, 2B, and 4 is replaced by a hook-shaped appendage. The hook-shaped first hinge elements 74 along one pair of adjacent sides of the module 72 have channels 76 that open upward. The hook-shaped hinge elements 78 on the other two adjacent sides have channels 80 that open inward. The arc length of the upwardly open hooks 74 is longer than the arc length of the inwardly open hooks 78. The bend 82 and tip end 84 of the shorter hooks 78 serve as slide members of the modules 72. The curvature and thickness of the hooks are complementary. They engage in a mating relationship that allows the hooks to slide along each other and to rotate smoothly.

Figure 6:
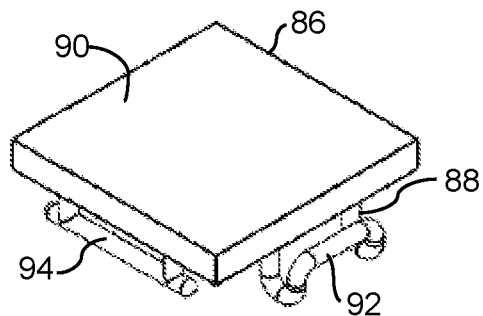
FIG. 6 is an isometric view of a wire-frame version of a belt module usable in a conveyor belt as in FIG. 1.
Figure 7:
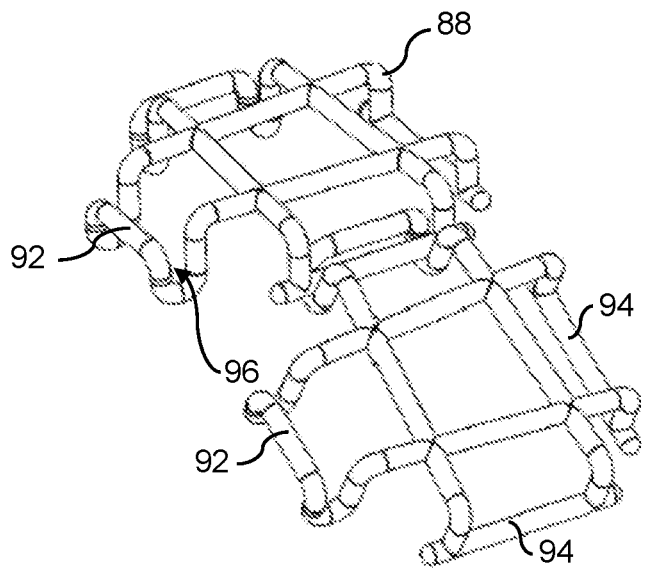
FIG. 7 is a view of the wire frame of two belt modules as in FIG. 6 with the platform removed for clarity.

The belt modules described thus far can be made of injection-molded thermoplastic or molded metal. The belt module 86 of FIGS. 6 and 7 is made of a wire frame 88 to which a platform 90 can be overmolded or otherwise attached. Like the module of FIGS. 2A and 2B, the wire frame 88 of the module in FIG. 6 forms hooks 92 on two adjacent sides and pins 94 on the other two sides. As shown in FIG. 7, pins 94 of one module are received in channels 96 formed by the hooks 92 of an adjacent module as for the modules of FIGS. 2A and 2B.

Figure 8:
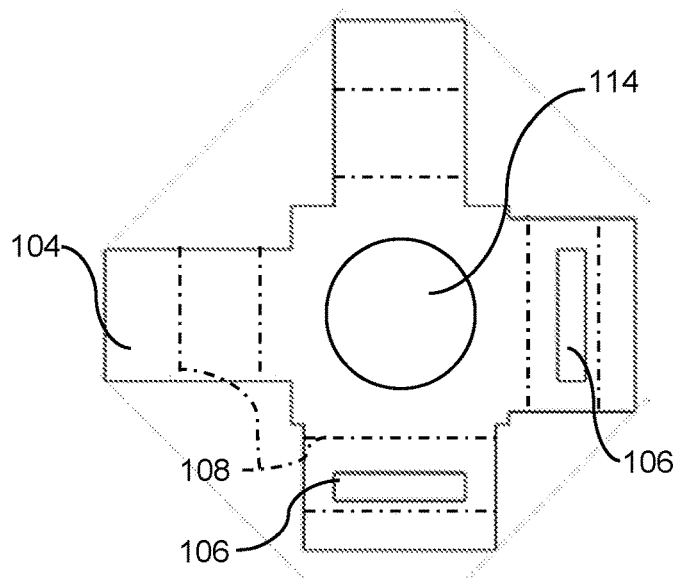
FIG. 8 is a top plan view of a punched flat metal sheet used to make a sheet-metal belt module usable in a conveyor belt as in FIG. 1.
Figure 9A:
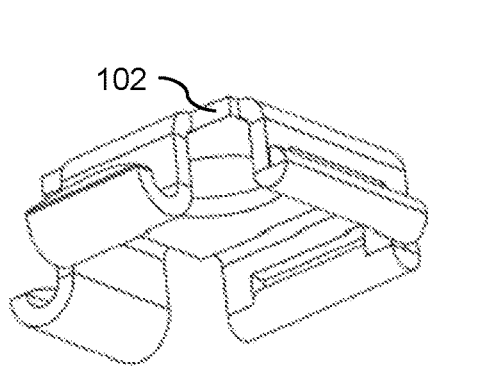
FIGS. 9A and 9B are bottom and top views of the base of a sheet-metal belt module made from the sheet of FIG. 8.
Figure 9B:
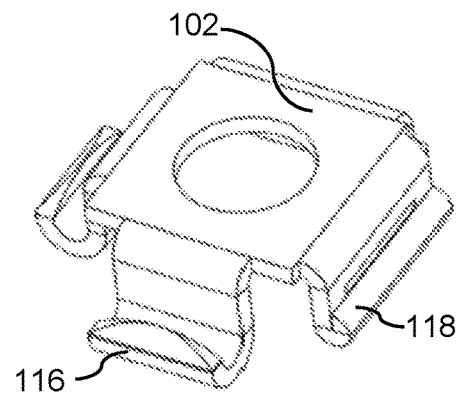
Figure 10:
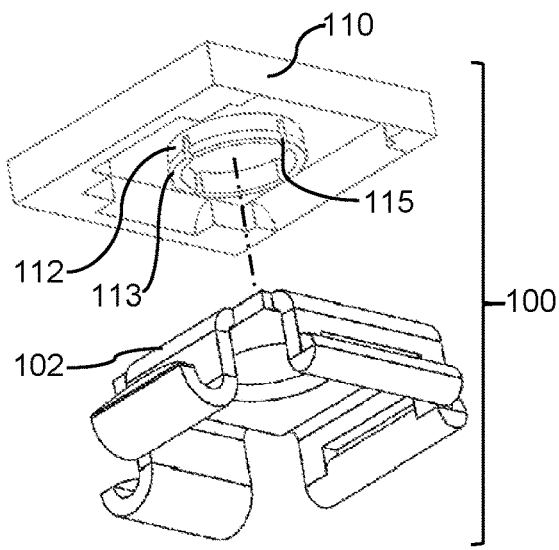
FIG. 10 is an exploded view of the entire sheet-metal belt module including the base of FIGS. 9A and 9B and a snap-on or molded-on platform.

Instead of a wire frame as in FIG. 7, the belt module 100 of FIG. 10 has a sheet-metal frame 102. The frame 102, also shown in FIGS. 9A and 9B, is formed from a flat metal sheet 104 as shown in FIG. 8. Gaps 106 and a central hole 114 are cut in the sheet. The flat sheet 104 is bent at bend lines 108 to form the sheet-metal frame 102. A pre-formed platform 110 has a bottom boss 112 with a lower lip 113. Slits 115 give the boss 112 a spring effect so that it can be snapped into the hole 114 in the center of the frame 102 and retained by the lower lip 113. Alternatively, a platform may be overmolded onto the frame 102. Hook-shaped hinge elements 116 and pin-type hinge elements 118 are formed along opposite pairs of adjacent sides of the sheet-metal frame 102.

FIGS. 11 and 12 show the components of a conveyor using a two-axis conveyor belt as in FIG. 1. FIG. 11 shows the belt 20 and drive components without a conveyor frame 120, which is shown separately in FIG. 12 for drawing clarity. The first belt loop 24 of the modular conveyor belt 20 is trained around two reversing wheels 122, 123. One of the reversing wheels can be a drive wheel and the other an idler wheel, or both can be drive wheels. In a similar way, the second belt loop 26 is trained around a pair of reversing wheels 124, 125. The reversing wheels 122, 123, 124, 125 have peripheral drive structure that engages drive structure on the undersides of the belt 20 to drive the first and second belt loops 24, 26 along first and second paths perpendicular to each other. The reversing drive wheels are shown driven by motorized rollers 126 mounted tightly in hollows 128 in the hubs 130 of the wheels 124. But the wheels could alternatively be driven by external motors via gear trains or by belts and pulleys as is common in the conveying industry. The diameter of the reversing wheels 122, 123 for the first belt loop 24 is greater than the diameter of the reversing wheels 124, 125 for the second belt loop 26.

The belt-loop paths are defined by the conveyor frame 120 of FIG. 12. The frame 120 includes a cruciform upper carryway 132 supporting the two belt loops 24, 26 along upper carryway segments of the conveying paths of the two loops. The frame 120 also includes a first return surface 134 that supports the first belt loop 24 in a lower return segment of the first path. A portion of a second return surface 136 for the second belt loop 26 in a lower return segment of the second path lies between the union 28 of the two belt loops at the middle of the cruciform carryway 132 and a portion of the first return surface 134. The two paths include reversing segments around the reversing wheels between the upper carryway segments and the lower return segments. The supporting return surfaces 134, 136 transition into cover portions 138 of the conveyor frame 120 around the reversing wheels 122, 123, 124, 125 to maintain the belt loops 24, 26 in engagement with the wheels. Thus, the cover portions 138 are continuous with the corresponding return surfaces 134, 136. Side walls 140 bounding the conveyor path segments maintain the belt loops in alignment. Position sensors 142 are used to sense when packages are in the union 28. If a package conveyed into the union 28 in the first belt loop 24 requires a 90° change in direction, the position sensor's signal is sent to a controller (not shown) that controls the loop drive motors to stop the first belt loop and start the second belt loop 26 to convey the package in the desired discharge direction.

Another version of a conveyor belt is shown in FIG. 13. The belt 144 has a single long loop 146 and two cross loops 148, 150 orthogonal to the long loop. The cross loops 148, 150 intersect the long loop 146 at unions 152, 154 on the carryway. The belt 144 is one example indicating that belts with different numbers of first and second groups of orthogonal belt loops can be constructed.

Figure 14:
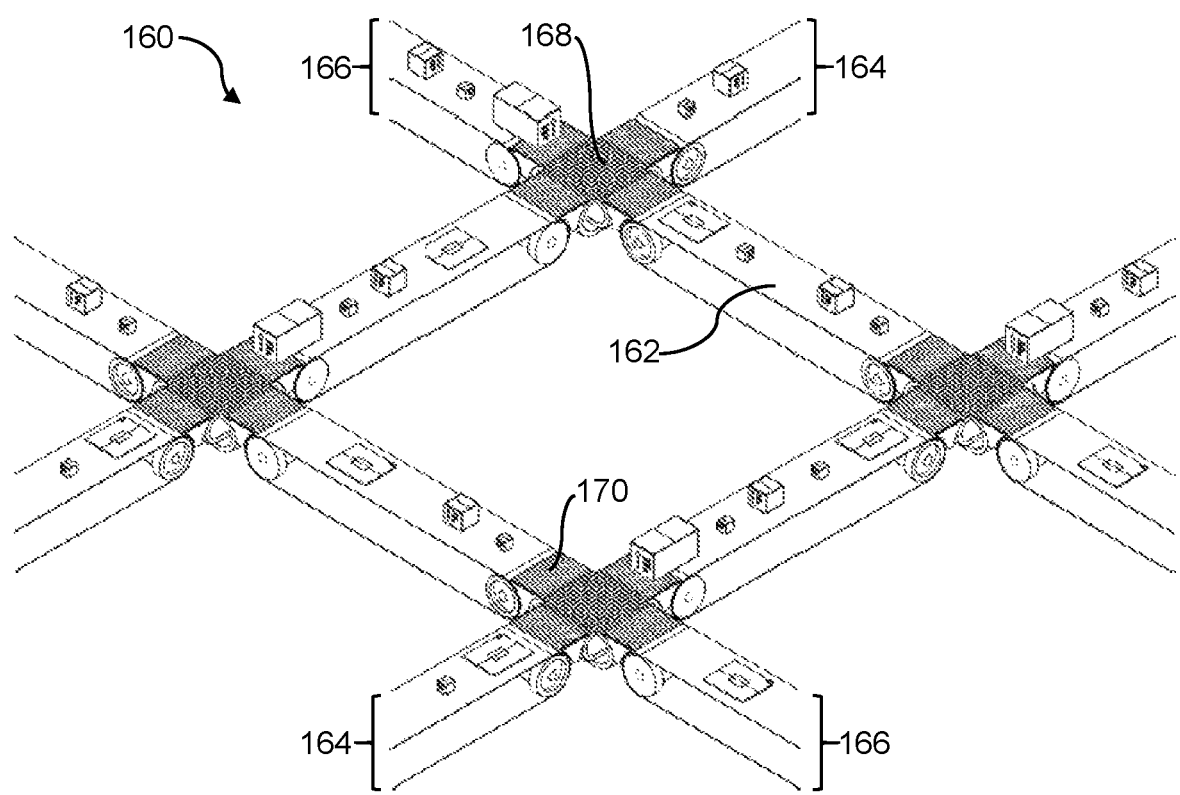
FIG. 14 is an isometric view of a portion of a grid sorter using two-axis conveyors as in FIG. 1.

The two-axis belt conveyors of FIGS. 11 and 12 are shown in a portion of a grid sorter 160 in FIG. 14. The grid sorter is constructed of series of bidirectional conveyors 162, such as belt conveyors or roller conveyors, arranged in a grid of north-south conveyor lines 164 and east-west conveyor lines 166. The north-south conveyor lines 164 intersect the east-west conveyor lines 166 at right angles. All the bidirectional conveyors 162 in the north-south conveyor lines 164 are parallel, and all the bidirectional conveyors in the east-west conveyor lines are parallel. Two-axis belt conveyors 168 are disposed at the intersections of the north-south and east-west conveyor lines 164, 168. The two-axis belt conveyors 168 transfer packages to and receive packages from the bidirectional conveyors 162 over the four sides of the two-axis conveyors. For tighter transfers, transfer platforms 170 can be interposed between the sides of the two-axis belt conveyors 168 and the bidirectional conveyors 162. Some of the two-axis belt conveyors could have a chute or elevating conveyor, rather than a horizontal bidirectional conveyor, at one or more sides to deliver packages to or receive packages from a grid sorter layer above or below in a three-dimensional, multi-layer grid sorter.

The two-axis belt conveyor can also be used to shift packages on the carryway. For example, a package conveyed into the union of the two belt loops on the carryway on a first belt loop can be shifted laterally across the first belt loop by stopping the first belt loop, running the second belt loop to shift the package across the first belt loop, stopping the second belt loop when the shift is complete, and running the first belt loop to transfer the laterally shifted package to a discharge conveyor.

What is claimed is:

1. A conveyor belt module comprising:
   a rectangular platform having a top, a bottom, a first pair of adjacent sides and a second pair of adjacent sides;
   a first hinge element extending downward from the platform along each side of the first pair of adjacent sides to a level below the level of the bottom of the platform;
   a second hinge element extending downward from the platform along each side of the second pair of adjacent sides to a level below the level of the bottom of the platform;
   wherein the first hinge elements form elongated channels extending parallel to each side of the first pair of adjacent sides and open at opposite ends; and
   wherein the second hinge elements form slide members receivable in the elongated channels of adjacent such conveyor belt modules to slide along the channels and to rotate in the channels about articulation axes positioned below the level of the bottom of the rectangular platform.

2. A conveyor belt module as claimed in claim 1 wherein the rectangular platform includes a square top surface.

3. A conveyor belt module as claimed in claim 1 wherein the slide members of the second hinge elements are hinge pins that are received in the elongated channels of the first hinge elements of adjacent such conveyor belt modules.

4. A conveyor belt module as claimed in claim 3 wherein the hinge pins are spaced apart from the platform by gaps.

5. A conveyor belt module as claimed in claim 1 wherein the first hinge elements are hook-shaped hinge elements.

6. A conveyor belt module as claimed in claim 5 wherein the hook-shaped hinge elements have a shank extending downward from the platform and an outward bend terminating in a tip end to define a throat upwardly open between the shank and the tip end and forming the elongated channel.

7. A conveyor belt module as claimed in claim 1 wherein the first hinge elements are hook-shaped hinge elements forming upwardly open elongated channels and wherein the second hinge elements are hook-shaped hinge elements forming downwardly open elongated channels.

8. A conveyor belt module as claimed in claim 7 wherein first hinge elements have a longer arc length than the second hinge elements.

9. A conveyor belt module as claimed in claim 1 wherein the platform includes half rounds extending along one of the first and second pairs of adjacent sides and half pipes extending along the other of the first and second pairs of adjacent sides.

10. A conveyor belt module as claimed in claim 1 wherein the first and second hinge elements are formed on a wire frame and wherein the platform is overmolded onto or snapped onto the wire frame.

11. A conveyor belt module as claimed in claim 1 wherein the first and second hinge elements are formed on a sheet-metal frame and wherein the platform is overmolded onto or snapped onto the sheet-metal frame.

12. A conveyor belt comprising:
    a first belt loop arranged to advance along a first path and including a plurality of belt modules in the form of rectangular platforms and hinge elements interconnecting adjacent belt modules in first rows extending across the width of the first belt loop and first columns extending the length of the first belt loop;
    a second belt loop including a plurality of belt modules in the form of rectangular platforms and hinge elements interconnecting adjacent belt modules in second rows extending across the width of the second belt loop and second columns extending the length of the second belt loop, wherein the second belt loop is arranged to advance along a second path intersecting the first path perpendicularly at a union of the first and second belt loops;
    wherein the hinge elements of each of the plurality of belt modules define articulation axes that lie in a common plane that does not intersect the rectangular platform; and
    wherein the belt modules at the union are shared by the first and second belt loops.

13. A conveyor belt as claimed in claim 12 wherein the first rows of the first belt loop at the union form the second columns of the second belt loop and wherein the first columns of the first belt loop at the union form the second rows of the second belt loop.

14. A conveyor belt as claimed in claim 12 wherein a portion of the second path lies within the first belt loop.

15. A conveyor comprising:
    a modular conveyor belt comprising:
    a first belt loop arranged to advance along a first path and including a plurality of belt modules in the form of rectangular platforms and hinge elements interconnecting adjacent belt modules in first rows defining the width of the first belt loop and first columns defining the length of the first belt loop;

a second belt loop including a plurality of belt modules in the form of rectangular platforms and hinge elements interconnecting adjacent belt modules in second rows defining the width of the second belt loop and second columns defining the length of the second belt loop;

wherein the hinge elements of each of the plurality of belt modules define articulation axes that lie in a common plane that does not intersect the rectangular platform;

first reversing wheels around which the first belt loop is trained and driven by at least one of the first reversing wheels along a first path, wherein the first path includes an upper carryway segment between the first reversing wheels and a lower return segment below the carryway segment;

second reversing wheels around which the second belt loop is trained and driven by at least one of the second reversing wheels along a second path, wherein the second path includes an upper carryway segment between the second reversing wheels and a lower return segment below the carryway segment;

wherein the second path intersects the first path perpendicularly at a union of the first and second belt loops on the carryway segments of the first and second paths;

wherein the belt modules at the union are shared by the first and second belt loops.

16. A conveyor as claimed in claim 15 comprising a first drive driving one of the first reversing wheels and a second drive driving one of the second reversing wheels, wherein the first and second drives drive only one of the first and second reversing wheels at a time.

17. A conveyor as claimed in claim 15 wherein a portion of the second path lies within the first belt loop.

18. A conveyor as claimed in claim 15 wherein the diameter of the first reversing wheels is greater than the diameter of the second reversing wheels.

19. A conveyor as claimed in claim 15 comprising a conveyor frame including:
- a cruciform carryway supporting the first and second belt loops along the upper carryway segments of the first and second paths;
- a first return surface supporting the first belt loop in the lower return segment of the first path;
- a second return surface supporting the second belt loop in the lower return segment of the second path;
- wherein a portion of the second return surface lies between the union of the first and second belt loops in the carryway segments and a portion of the first return surface.

20. A conveyor as claimed in claim 19 wherein the first and second paths include reversing segments around the first and second reversing wheels between the upper carryway segments and the lower return segments and wherein the conveyor frame includes cover portions covering the first and second belt loops in the reversing segments.

21. A conveyor as in claim 20 wherein the cover portions covering the first belt loop are continuous with the first return surface and the cover portions covering the second belt loop are continuous with the second return surface.

22. A conveyor as claimed in claim 15 comprising:
- a plurality of bidirectional conveyors arranged in a grid of first parallel conveying lines and second parallel conveying lines perpendicular to the first parallel conveying lines;
- a plurality of the modular conveyor belts and the associated first and second reversing wheels disposed at intersections of the first and second conveying lines and close enough to the plurality of bidirectional conveyors in the first and second conveying lines to transfer packages to and receive packages from the bidirectional conveyors.

* * * * *